Fig. I.

INVENTORS
ERNEST GEORGE LAWRENCE
THOMAS HENRY KENNETH HUGHES

United States Patent Office 3,552,828
Patented Jan. 5, 1971

3,552,828
MOUNTING ARRANGEMENTS FOR A REPLACEABLE SEMI-REFLECTIVE MEMBER OF A HEAD UP DISPLAY DEVICE
Ernest G. Lawrence and Thomas H. K. Hughes, London, England, assignors to Elliott Brothers (London) Limited, London, England, a British company
Filed Aug. 1, 1968, Ser. No. 749,376
Claims priority, application Great Britain, Aug. 9, 1967, 36,574/67
Int. Cl. G02f 27/14
U.S. Cl. 350—174
5 Claims

ABSTRACT OF THE DISCLOSURE

The semi-reflective member is replaceably mounted by edge members having similar temperature coefficient of expansion. The edge members are mounted on a framework so that the semi-reflective member can be moved between at least two predetermined positions. These positions are finely adjustable by an eccentrically mounted adjusting arrangement.

---

Figure 1:
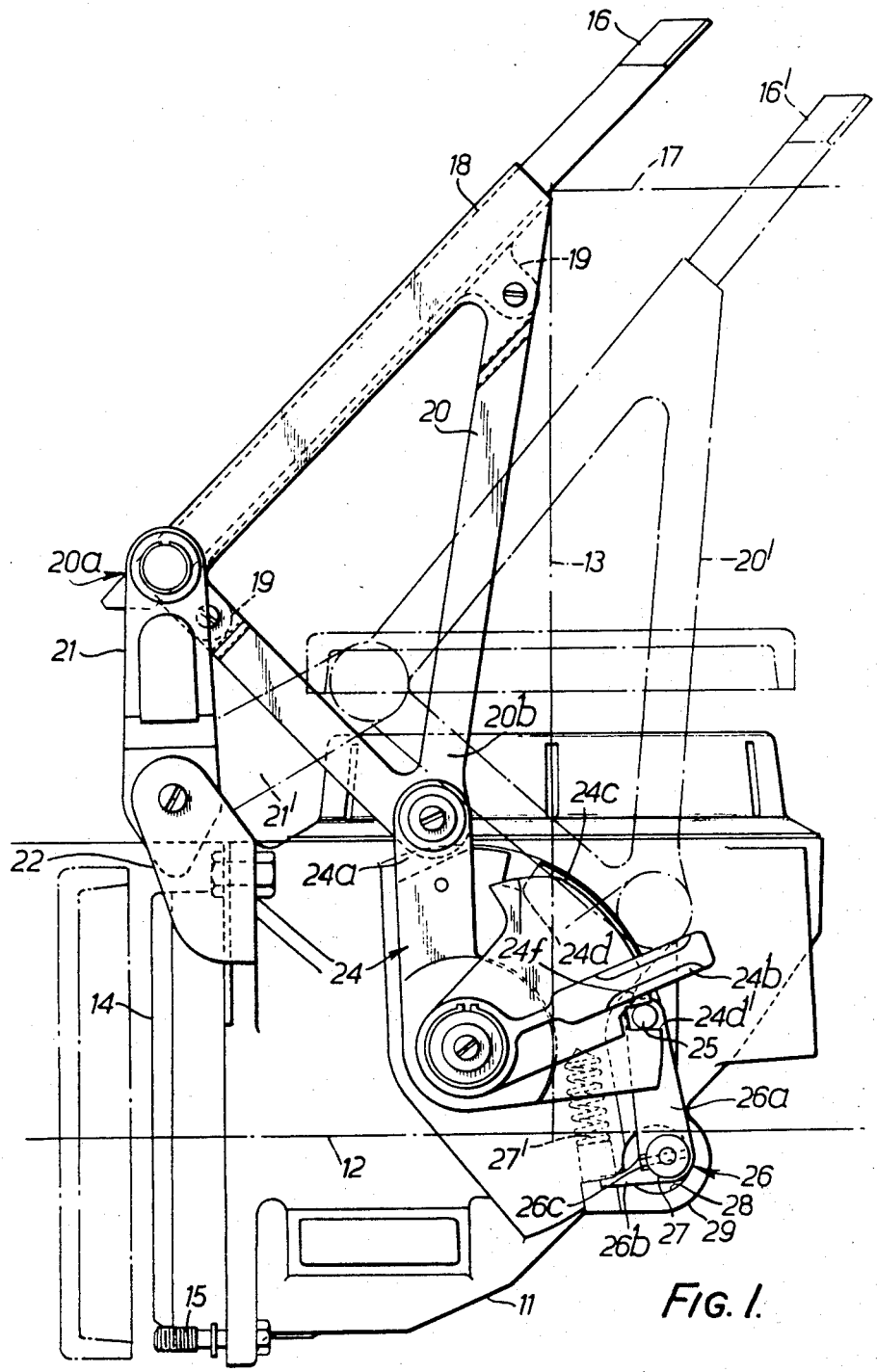

The invention relates to mounting arrangements and particularly, although not exclusively, to mounting arrangements utilisable in the lens unit of a head-up display device for aircraft.

It is a particular object of the present invention to provide a mounting arrangement for a semi-reflective member of a head-up display device which enables a damaged or broken member to be replaced and, by simple adjustment of the mounting arrangement, to be accurately located with respect to the head-up display device.

According to the present invention there is provided in combination with a head-up display device a mounting arrangement for a replaceable semi-reflective member, the arrangement including support means for supporting the semi-reflective member and mounted to be movable between at least two positions, location means cooperating with the support means to locate said positions and eccentric adjustment means adjustably mounting the location means to vary the location of the location means, said positions of the support means, and the corresponding positions of the semi-reflective member.

The support means may comprise at least one triangular framework which carries the semi-reflective member along one edge thereof, is pivotally mounted at a corner thereof, including said one edge, to a linkage which is pivotally mounted on means to be fixed relative to the head-up display device and is pivotally mounted at the corner remote from said one edge to one arm of a bell crank lever which is pivotally mounted on said means and the other arm of which is associated with a lever, which may be manually operable, for moving the semi-reflective member between said positions.

The bell crank lever may include an arcuate camming surface including at least two slots or grooves, the location means comprising a roller engageable with the slots or grooves to locate the semi-reflective member in said respective predetermined positions and movable over the arcuate surface when the semi-reflective member is being moved between said predetermined positions, the roller being carried by one arm of a further bell crank lever which is eccentrically mounted.

The other arm of the further bell crank lever may be resiliently biased so as to tend to urge the roller into the slots or grooves.

There may be two opposed frameworks, positioned at opposed edges of the semi-reflective member, together with associated pairs of bell crank levers and further bell crank levers mounted on respective common axes.

According to yet a further aspect of the invention there is provided a mounting arrangement for a semi-reflective member of a head-up display device in which the semi-reflective member for displaying images produced by the head-up display device is replaceably mounted by support means which is mounted so as to be movable between at least two predetermined positions, the exact location of said predetermined positions being adjustable.

Figure 2:
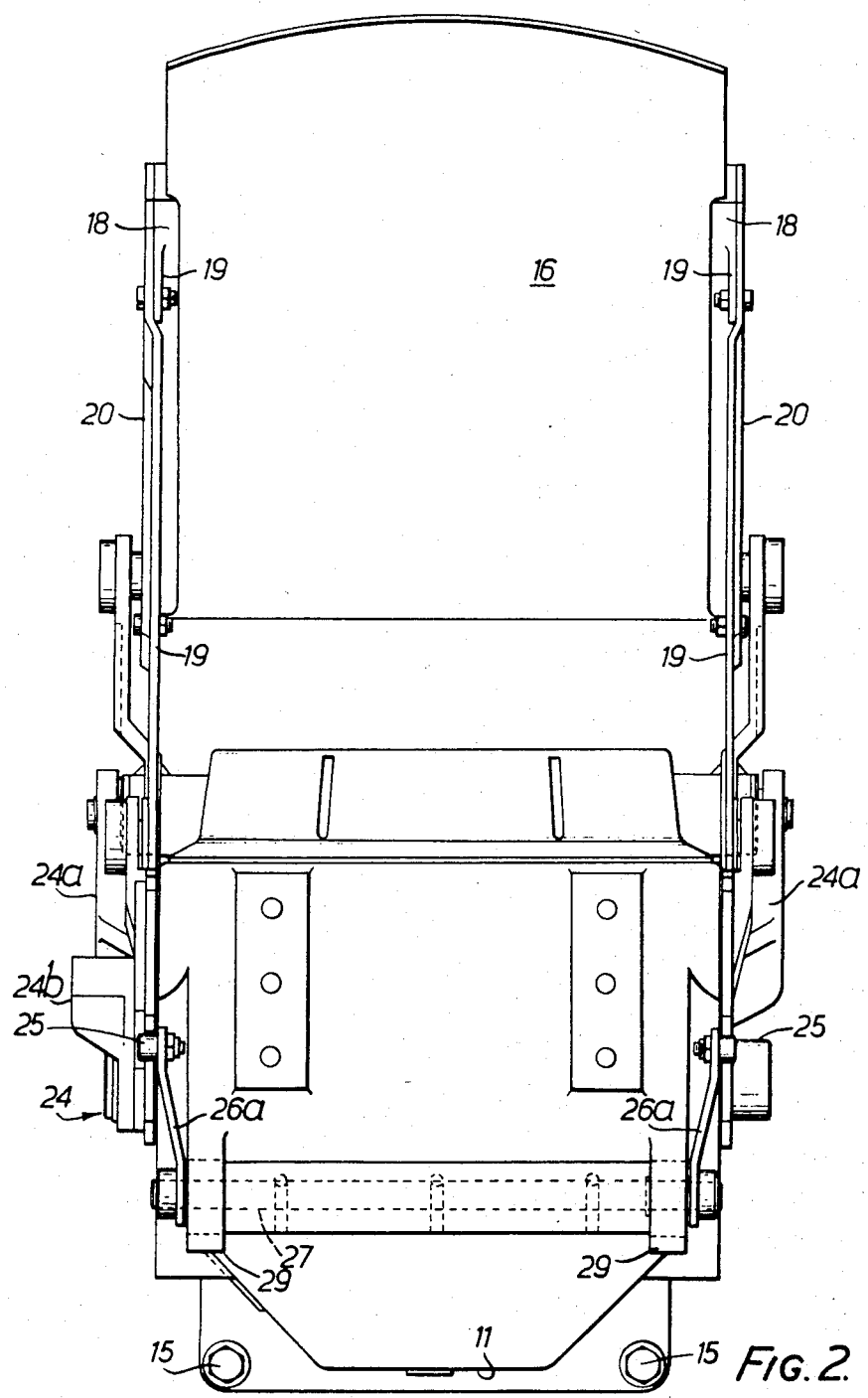

The foregoing and further features of the invention may be more readily, understood from the following description of a preferred embodiment thereof, by way of example, with reference to the accompanying drawings, in which:

FIG. 1 is a side elevational view of the mounting arrangement for a replaceable semi-reflective member of a head-up display device; and FIG. 2 is an end elevational view of the unit of FIG. 1.

Referring now to the drawings there is partially shown a head-up display device comprising a lens housing 11 containing a lens arrangement (not shown) which is such that light rays produced by the head-up display unit enter the lens housing 11 in a direction along the line 12 (FIG. 1) and are deflected through 90° to emerge from the lens housing 11 in a direction along the line 13. The lens housing 11 is mounted on a head-up display device at its side 14 and retained in position by mounting screws 15.

Light rays emitted from the lens housing in the direction of line 13 impinge upon a semi-reflective member 16 and are again reflected through an angle to pass in a direction along line 17 for viewing. The semi-reflective member 16 comprises a sheet of polished twin ground glass plate which is, over its entire surface fifty percent coated so as to display the image and also to allow viewing therethrough, the member 16 is fifty percent reflective and fifty percent transmissive.

The semi-reflective member 16 has channel section members 18 cemented to opposed edges thereof. The channel section edge members 18 are fabricated from a special steel, such as Invar which has the same or similar temperature coefficient of expansion to that of the semi-reflective member 16. The channel section edge members 18 are formed with lugs 19 which facilitate attachment of the channel section edge members 18 to one side of respective triangular-shaped frameworks 20.

Each triangular-shaped framework 20 is pivotally mounted at one corner 20a to a separate link 21. Each link 21 is pivotally mounted at its other end on a separate lug 22 which is part of the lens housing 11. A further corner 20b of each framework 20 is pivotally mounted to one arm 24a of a respective bell crank lever 24 which is in turn pivotally mounted on the lens housing 11.

The other arm of each bell crank lever 24 is formed with an arcuate surface 24c, having two spaced-apart slots 24d and 24d' formed therein. Associated with the other arm of one bell crank lever is manually operable member 24b having two camming surfaces 24f.

The bell crank levers 24 are located in one or two predetermined positions by location means comprising rollers 25 which are engageable in the slots 24d and 24d'. Each roller 25 is carried on the end of one arm 26a of a respective further bell crank lever 26. The other arm 26b of each said further bell crank lever 26 is resiliently biased by a respective coil spring 27' carried in the lens housing 11. The arms 26a and 26b of each further bell crank lever 26 are mounted on a rod, the bearings of which are contained in an eccentric section tubular member 27, which is located adjacent its ends in apertures 28 formed in lugs 29 projecting from the lens housing 11.

By rotating the tubular member 27 the pair of further bell crank levers 26 is made to describe a circular orbit. Hence it will be seen that the two bell crank levers 26 are eccentrically and adjustably mounted relative to the lens housing 11.

In FIG. 1 the semi-reflective member 16 is shown in full lines in its uppermost position whereas it is shown in dashed lines at 16' in its lowermost position. To move the semi-reflective member 16 from its uppermost to its lowermost position the member 24b is moved clockwise so that camming surfaces 24f move the rollers 25 out of the slots 24d' the arms 26a of further bell crank levers 26 moving in a clockwise direction to permit this against the bias of the springs 27. The member 24b now engages the lever 24 and rotates the lever 24 clockwise, the rollers 25 rolling on the arcuate surfaces 24c. When the semi-reflective member reaches its position as indicated at 16' the rollers 25 are engaged in slots 24d' of bell crank levers 24. The position of frameworks 20 and links 21 are shown dotted at 20' and 21' respectively for such positioning. To return to the upper position a reverse procedure is employed. First the anticlockwise motion of the member 24b to cam the rollers out of the notches 24d' and then, after the lost motion, the combined movement of member 24b and lever 24 until the rollers engage slots 24d. When in its uppermost position the semi-reflective member 16 must be positioned at an angle of 45 degrees 15 minutes to the plane of the upper surface of lens housing 11 with an accuracy of plus or minus 2.5 milli-radians. Further in its lowermost position the semi-reflective member 16 must be at an angle of 4 degrees to its location in its uppermost position within the limit of plus or minus .5 milli-radians. The extreme accuracy of positioning is facilitated by the eccentric mounting of the bell crank lever 26.

With the arrangement disclosed should the semi-reflective member 16 be damaged or broken during use it merely necessary to unscrew the channel section edge members 18 from location on the frameworks 20 for replacement by a new assembly of semi-reflective member 16 and channel section edge members 18. Since it is not possible to manufacture such units within the required tolerances the positioning of the whole arrangement can be reset merely by releasing bolts 26c which lock the bearing arrangements of the further bell crank levers 26 to tubular member 27 and then rotating tubular member 27. Such a motion imparted to levers 26, which each have one end constrained by its roller 25 engaged in slot 24d causes the rollers 25 to traverse an arc about the pivot of lever 24, thus moving lever 24. This controlled movement of lever 24 produces the required adjustment of member 16 to within the required limits.

Because head-up display devices with which the arrangement disclosed is to be utilised are subject to extreme environmental conditions in aircraft, it is necessary to mount the semi-reflective member 16 on an expensive special steel having the same or similar temperature coefficient of expansion to that of such member 16. It will be noted that with the arrangement disclosed the components fabricated of such special steel, i.e. channel section edge members 18, are kept to a minimum, so reducing costs.

We claim:

1. In combination with a head up display device a mounting arrangement for a replaceable semi-reflective member, the arrangement including:
   a frame;
   support means pivotally coupled to said frame and removably supporting said semi-reflective member, said support means being movable between first and second predetermined positions;
   location means pivotally coupled to said frame and pivotally coupled to said support means to locate said support means in said predetermined positions; and
   eccentric adjusting means including:
      means selectively engaging said location means at at least two positions on said location means, said two positions corresponding to said first and second positions of said support means; and
      means eccentrically coupling said engaging means to said frame for varying the position of said engaging means relative to said frame for adjusting the precise location of said first and second predetermined positions relative to said frame.

2. A combination as claimed in claim 1, wherein said support means includes:
   at least one triangular framework which carrries the semi-reflective member along one edge thereof;
   a linkage which is pivotally mounted to said frame and which is pivotally mounted to a corner of said triangular frame work which includes said one edge;
   a bell crank lever pivotally mounted at a corner of said triangular framework which is remote from said one edge, said bell crank lever being pivotally mounted on said frame; and
   lever means coupled to the other arm of said bell crank lever for moving said semi-reflective member between said predetermined positions.

3. A combination as claimed in claim 2, wherein:
   said bell crank lever includes an arcuate surface having at least two slots or grooves formed therein;
   said engaging means includes a roller engageable with said slots or grooves to locate said support means in said predetermined positions;
   said eccentrically coupling means includes a further bell crank lever which is eccentrically coupled to said frame, said further lever carrying said roller, said roller being movable over said arcuate surface when said support means is being moved between said predetermined positions.

4. A combination as claimed in claim 3 wherein said bell crank lever includes camming surfaces for moving said rollers out of said slots.

5. A combination as claimed in claim 4 comprising biasing means biasing the other arm of said further bell crank lever to urge the roller into the slots or grooves.

References Cited
UNITED STATES PATENTS
2,430,551 11/1947 Arnold et al. _____ 350—310X
3,415,951 12/1968 Heller _____ 350—174UX DAVID SCHONBERG, Primary Examiner
J. W. LEONARD, Assistant Examiner U.S. Cl. X.R.
74—96; 350—310